US010127705B2

(12) United States Patent
Lim et al.

(10) Patent No.: US 10,127,705 B2
(45) Date of Patent: Nov. 13, 2018

(54) METHOD AND APPARATUS FOR DYNAMIC GEOFENCE SEARCHING OF AN INCIDENT SCENE

(71) Applicant: MOTOROLA SOLUTIONS, INC, Chicago, IL (US)

(72) Inventors: Bing Qin Lim, Jelutong (MY); Alfy Merican Ahmad Hambaly, Bayan Baru (MY); Shijie Hua, Puchong (MY); Chew Yee Kee, Alor Setar (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 110 days.

(21) Appl. No.: 15/390,470

(22) Filed: Dec. 24, 2016

(65) Prior Publication Data
US 2018/0182142 A1  Jun. 28, 2018

(51) Int. Cl.
G09G 5/00 (2006.01)
G06T 11/60 (2006.01)
G06F 3/01 (2006.01)
G06F 17/30 (2006.01)
G09G 3/00 (2006.01)
G06T 19/00 (2011.01)

(52) U.S. Cl.
CPC ............ *G06T 11/60* (2013.01); *G06F 3/012* (2013.01); *G06F 17/3056* (2013.01); *G06T 19/006* (2013.01); *G09G 3/003* (2013.01)

(58) Field of Classification Search
None
See application file for complete search history.

(56) References Cited

U.S. PATENT DOCUMENTS

| 7,451,030 | B2 | 11/2008 | Eglington et al. |
| 8,407,142 | B1 | 3/2013 | Griggs |
| 8,510,166 | B2 | 8/2013 | Neven |
| 8,558,759 | B1 | 10/2013 | Prada et al. |
| 8,965,460 | B1* | 2/2015 | Rao .................. G06F 3/005 455/566 |
| 8,998,083 | B2 | 4/2015 | MacIntyre |
| 9,235,870 | B2 | 1/2016 | Kottoor et al. |
| 2009/0171961 | A1 | 7/2009 | Fredrickson |

(Continued)

OTHER PUBLICATIONS

2dSparrow, "Your Opponent and Where to Find Them—Starcraft 2 Scouting Guide", Jan. 20, 2016, URL:https://www.youtube.com/watch?time_continue=55&v=7ayHiU_HgfQ.*

(Continued)

*Primary Examiner* — David H Chu

(57) ABSTRACT

An incident scene is searchable via a portable communication device and method that provides for displaying a masked augmented reality of the incident scene to the display of the portable communication device. A geofenced area is applied within the displayed masked augmented reality of the incident scene as an indication to the user of an area to be searched. As the geofenced area is searched, masking is removed from the displayed masked augmented reality of the incident scene. The masking is only being removed within the geofenced area based on user attention span provided to the geofenced area. The removal of masking indicates areas that have been searched.

22 Claims, 8 Drawing Sheets

(56) References Cited

U.S. PATENT DOCUMENTS

| | | | | |
|---|---|---|---|---|
| 2012/0313968 | A1* | 12/2012 | Yoshioka | G06F 3/1454 345/629 |
| 2013/0095924 | A1* | 4/2013 | Geisner | G06F 3/012 463/32 |
| 2013/0314398 | A1* | 11/2013 | Coates | G09G 5/14 345/419 |
| 2014/0125699 | A1* | 5/2014 | Lotto | G06T 19/006 345/633 |
| 2014/0160162 | A1* | 6/2014 | Balachandreswaran | G03B 17/54 345/633 |
| 2014/0168056 | A1* | 6/2014 | Swaminathan | G06K 9/00604 345/156 |
| 2014/0267411 | A1* | 9/2014 | Fein | G06T 11/00 345/633 |
| 2016/0070344 | A1* | 3/2016 | Gohl | G06F 3/013 345/156 |
| 2016/0080155 | A1* | 3/2016 | Arat | G06F 21/6209 380/28 |
| 2016/0275918 | A1* | 9/2016 | Milam | G09G 5/14 |
| 2016/0342840 | A1* | 11/2016 | Mullins | G06K 9/00671 |

OTHER PUBLICATIONS

IT Works, "Throne Defense: Robot Wars (Augmented Reality Game) [en]", May 27, 2016, URL: https://www.youtube.com/watch?v=0v6I5eZ3VSM.*

Sangchul Ahn, "Scratch Card—An augmented reality application in HTML5", Oct. 15, 2013, URL: https://www.youtube.com/watch?v=u--yT3yr_Ek.*

148apps.com, "App Detail » Thrones Defense: Robots War (AR) Pro", URL: http://www.148apps.com/app/1113932578/.*

Liquipedia, "Sight", Sep. 30, 2014, URL: https://liquipedia.net/starcraft2/Sight.*

Teamliquid, "Another Look at Hight Ground Advantage", Jan. 23, 2013, URL: http://www.teamliquid.net/forum/starcraft-2-hots/394845-another-look-at-high-ground-advantage.*

Batlle.net, "Observer", May 27, 2009, URL: https://web.archive.org/web/20090327075453/http://classic.battle.net/scc/protoss/units/observer.shtml.*

Ragos Datcu et al: 1 Handheld Augmented Reality for Distributed Collaborative Crime Scene Investigation11 , Support! NG Group Work, ACM, 2 Penn Plaza, Suite 701 New York NY 10121-0701 USA, Nov. 13, 2016 (Nov. 13, 2016). pp. 267-276, XP058306160,DOI: 10.1145/2957276.2957302ISBN: 978-1-4503-4276-6.

Veronika Domova et al: "Designing a Remote Video Collaboration System for Industrial Settings", Interactive Tabletops and Surfaces, ACM, 2 Penn Plaza, Suite 701 New York NY 10121-0701 USA, Nov. 16, 2014 (Nov. 16, 2014), pp. 229-238, XP058061663,DOI: 10.1145/2669485.2669517ISBN: 978-1-4503-2587-5pp. 231,232.

The International Search Report and the Written Opinion corresponding application No. PCT/US2017/066070 filed Dec. 13, 2017, dated Mar. 26, 2018, all pages.

Sashah James Eftekhari: "Augmented Reality and Scene Examination", The University of Birmingham, A thesis submitted in partial fulfillment for the degree of Doctor of Philosophy in the Department of Electronic, Electrical and Computer Engineering, Mar. 2011, all pages.

* cited by examiner

METHOD AND APPARATUS FOR DYNAMIC GEOFENCE SEARCHING OF AN INCIDENT SCENE

RELATED APPLICATIONS

This application is related to co-pending U.S. application Ser. No. 15/390,471 and co-pending US application Ser. No. 15/390,472 both commonly assigned to and owned by Motorola Solutions, Inc.

FIELD OF THE INVENTION

The present invention relates generally to communication systems that facilitate searching incident scenes for evidence, and more particularly to a portable electronic device that provides a visual distinction between searched and unsearched areas through the application and control of a geofence.

BACKGROUND

Communication systems, particularly those used in public safety environments such as law enforcement, fire rescue, and mission-critical environments, are often called upon to investigate an incident scene, whether it be the crime scene, accident scene or other incident scene involving forensic analysts and investigators. It is not uncommon for numerous individuals, some from different job functions and backgrounds, to show up at an incident scene for the gathering and preservation of evidence. For example, crime scene investigators, first responders, forensic specialists, may be just a few of the individuals involved in searching and recreating an incident scene.

While it is important to delineate responsibilities to the appropriate people, it is not uncommon to have some efforts unnecessarily duplicated due to miscommunication between individuals arriving at the scene. For some incident scenes, there may be a need to different types of specialist to go over the same area looking for different evidentiary data. However, different roles and different levels of expertise from different users may result in an uncertainty as to how well an area has been searched.

Accordingly, there is a need for managing and controlling the search of an incident scene.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
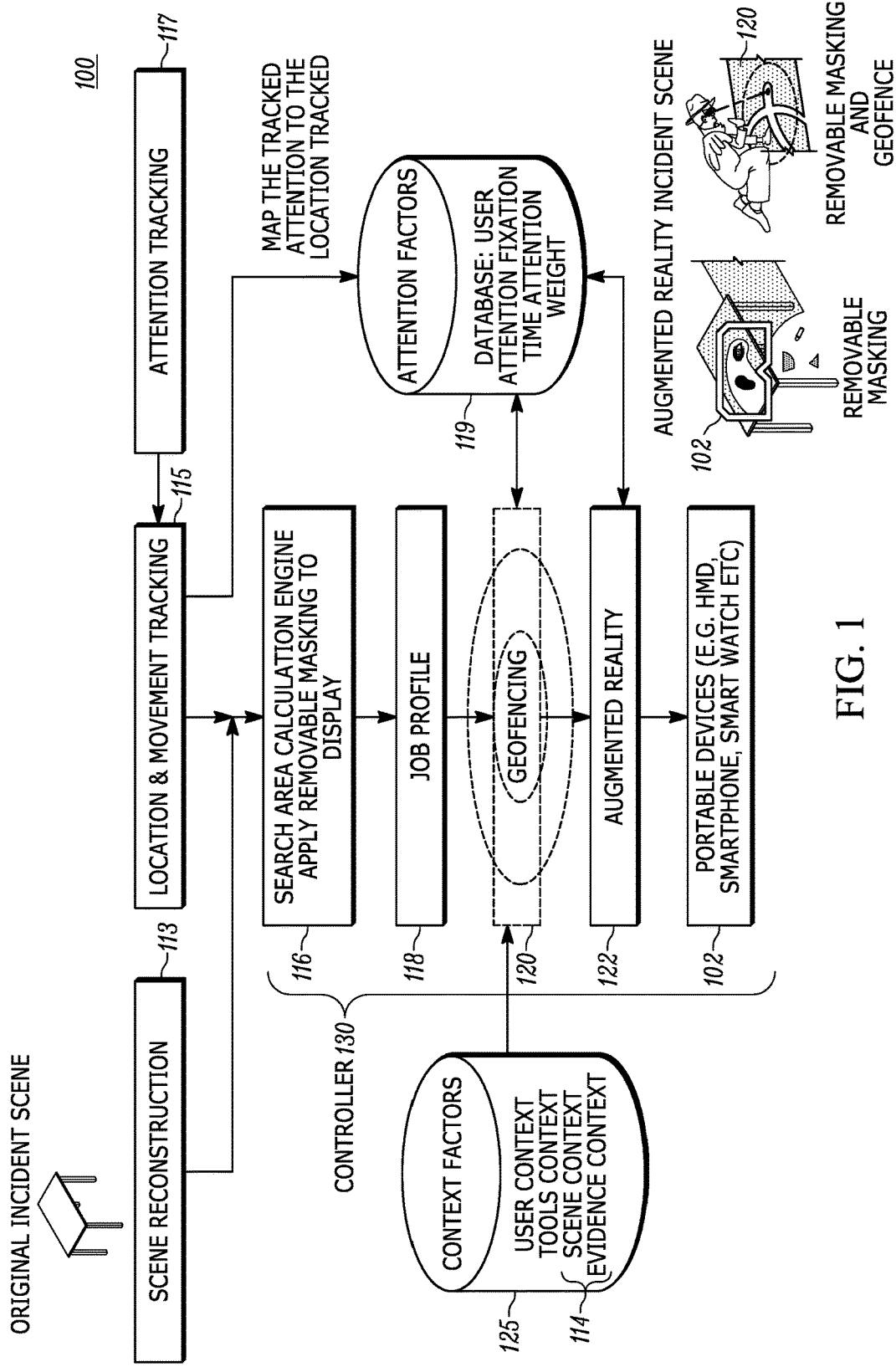
FIG. 1 is a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a portable communication device and method that displays a masked augmented reality of an incident scene to a display. Searching of the incident scene is facilitated via the masked augmented reality as areas of the augmented reality masking are removed in response to being searched, based on a user's attention span to that area. A geofenced area can further be applied within the displayed masked augmented reality of the incident scene as an indication to the user of a dedicated area to be searched. As the area within the geofence is searched, masking is removed. Geofenced areas are set based on user-investigator profiles. Removal of masking is only permitted within the geofenced area thereby ensuring that an appropriate amount of search diligence is made. The removal of masking indicates areas that have been searched. Areas outside of geofenced boundaries will remain masked, even if searched.

FIG. 1 is a communication system 100 formed and operating in accordance with the embodiments. Communication system 100 comprises a portable communication device 102, such as a head mounted display (HMD) or other wearable display device, capable of providing augmented reality to a person's field of view. In accordance with the embodiments, communication system 100 provides for an augmented reality incident scene displayed on the portable communication device 102 wherein the augmented display provides removable masked highlighting to search areas. In accordance with further embodiments, the portable communication device 102 may further display a geofenced search boundary within the masked highlighted area. In accordance with even further embodiments, the geofenced search boundary may further be embodied and displayed as nested geofences to further refine a search of an incident scene.

In accordance with the embodiments, communication system 100 comprises scene reconstruction 113, location and movement tracking 115, and attention tracking 117 which are input to a controller 130 of a portable communication device 102. The description will begin with the scene reconstruction 113, location and movement tracking 115, and attention tracking 117 and then move to the controller 130.

An initial incident scene is reconstructed 113 using a variety of augmented reality generation techniques, such as 3-D laser scanning, real time kinematics (RTK), drones and/or the like which can gather context factor information from the incident scene suitable for the generation of an augmented reality display to a portable communication device 102. The incident scene reconstruction 113 is further enabled through initial context parameters being entered into the portable communication device 102 by a user of the device performing an initial walkthrough of the incident scene. The context parameters are stored within context factors database 125.

Location and movement tracking 115 takes into account the position of currently available user-investigators at an incident scene. Different user investigators are tracked, via their portable communication device, as to where each is located within the incident scene. Tracking techniques such as GPS, laser scanning, indoor location tracking, inertia sensors (e.g. accelerometer, gyroscope), magnetometer, beacon triangulation, image sensor, infrared camera and the like can be used. Location and movement tracking may be pre-associated via Bluetooth pairing between the wearable portable communication device 102 of the user-investigator and an investigator's tool if a tool is being used. The investigator's tool location and orientation can be tracked via a motion sensor, for example an inertia sensor, accelerometer, gyrometer, magnetometer, or even infrared lighting tracking and image processing by a image sensor e.g. camera Attention tracking 117 performs detection of a user's attention span on an area within the incident scene. In accordance with the embodiments, augmented reality masking can be removed in response to a user's attention span. Detection may be through, for example a camera on the wearable device (e.g. HMD, body worn camera) which may utilize video analytics to detect illuminated surfaces by a torch light, or user gaze direction. Detection may be through motion sensor on the wearable device as well to detect the orientation of the head. For embodiments in which a geofence is applied, the geofenced boundary can be verified to ensure the user-attention is falling within the geo-fenced boundary prior to removing any augmented reality masking.

In accordance with the embodiments, the controller 130 comprises a search area calculation engine and application of removable masking on display 116, a job profile assessment engine 118, and a geofencing engine 120.

The controller 130 takes the reconstructed scene 113 and determines based on initial context factors provided during scene reconstruction and determines which area of the incident scene should be searched and augments that area with removable masking 116. The removable masking may be in the form of darkened area, color coded area with certain opacity, or areas with certain texture or pattern overlaid on the HMD augmented reality display. The HMD display could be a full view display, or partial view display (a small display at one corner of the HMD like google glass), tablet, cell phone, and the like.

The removable masking of the embodiments can be extended to other types of devices, such as tablets and smart phones, as well as other portable devices that have a display, tracking capability, a light source, with camera and/or video capture capability. For example, a tablet having a camera can capture front views of an incident scene and these scenes can be shown on the tablet's display. The user's attention span is determined by the tablet's direction, using the tablet's flash light operating as a replacement for the handheld torch style light described previously. In accordance with these tablet and cell phone type embodiments, the area masking can be removed in the manner previously described using attention span, while the masked and removed masking are displayed on the tablet itself. So, although these devices are not mounted to the head, like the HMD, the application of the removable masking readily extends to these devices. The examples provided herein thus apply to these types of devices as well in accordance with the embodiments.

The geofencing engine 120 receives input from the job profile assessment engine 118 as to the type of experience needed to handle a particular incident scene. The job profile assessment engine 118 can make determinations based on level of experience a user-investigator may need for an assignment or type of incident, and his/her ability to search the scene using only the removable augmented masking or whether to proceed to further enhance the augmented masked display with geofencing 120.

Moving to the geofencing engine 120, the geofencing engine receives input from two databases, referred to as a context factor database 125 and attention factors database 119. The context factors database 125 stores information pertaining to user-investigator profiles (user context), investigator tools (tools context), evidence attributes 114 (evidence context parameters and incident scene context parameters), and any information entered and stored into or gathered as part of the incident scene reconstruction 113 which can be dynamically uploaded or retrieved. The context parameters 125 can be gathered as mentioned previously during the initial walkthrough and/or using other scene reconstruction techniques at scene reconstruction 113. The context factor database 125 can store user context parameters for a plurality of different user-investigators, thereby allowing the portable communication device 102 to be shared yet customized for each individual investigator.

The context factors database 125 may be located within portable communication device 102 and the context parameters contained therein retrieved by controller 130, for example by geofence engine 120. In accordance with some embodiments, the geofence engine 120 can retrieve the user-investigator context, such as user experience, to determine a boundary size for a geofence. In accordance with another embodiment tool type context can also be used to determine a second nested geofence boundary.

The geofencing engine 120 further receives inputs from the attention factors database 119 to further enhance the geofence determination, such as based on past user fixation times. For example, longer search timeframes may be needed for less experienced user-investigators that have used the portable communication device 102 in the past and have these longer timeframes stored within the database 119. An appropriate geofenced boundary can thus be applied as part of the augmented reality display 122 of portable communication device 102.

The attention factors database 119 also records a user's attention fixation time when that time falls within an appropriate attention time span to warrant removal of masking to the augmented reality display 122. The portable communication device 102 is able to track and make adjustments to attention span thresholds as a user's experience increases, due to the fact that the context database 125 is also updating the latest information pertaining to the user. Thus, an optimal geofenced boundary is displayed as part of the augmented reality 122 on the display of portable communication device 102.

The application of geofenced boundaries provide the advantage of providing indicators of areas to search based on user profiles and expertise and the ability to track whether an area has been sufficiently searched based on the user's attention span vis-a-vis the user's experience. By dynamically adjusting the geofences for each investigator, taking into account user context and tools from the context factors 125 along with prioritization attention weighting factors from database 119 allows for a far more comprehensive and diligent search of an incident scene.

Figure 2:
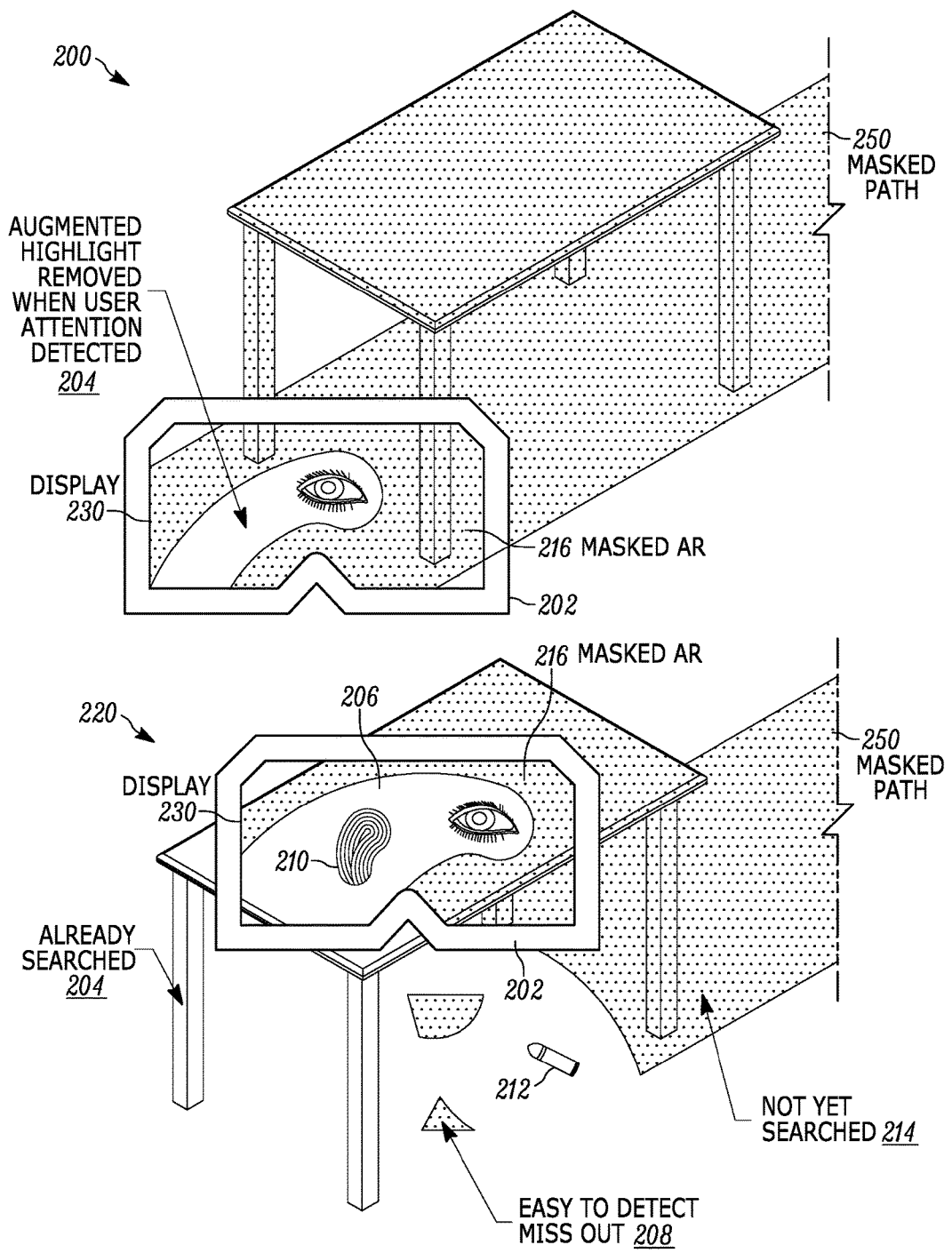
FIG. 2 shows a portable communication device displaying an augmented reality scene with augmented highlight removed indicating user attention detected and an area already searched in accordance with some of the embodiments.

FIG. 2 and remaining figures illustrate an 'eye' icon to represent eye gaze. The embodiments provided herein enhance the user's ability, beyond eye gaze, to search an area by providing focused areas of attention to search. To this end, masked highlighting and/or geofenced areas and/or user tools can all be incorporated within the system to determine which areas to search, focus the search, and verify that an area has been thoroughly searched.

FIG. 2 shows an incident scene in views 200 and 220 in which a portable communication device 202, shown as HMD 204, is displaying an augmented reality scene through a display 230 of a masked search area or masked path 250. In accordance with some of the embodiments, the masked search area or search path 250 is formed based on user context, such as user role and/or experience. View 200 further illustrates portions of the masking being removed 204 indicating user attention detected. In view 220, the augmented view as seen through display 230 indicates a new area masking being removed 206 in response to user attention, and further shows that the previous area-searched area will remain unmasked, shown as unmasked area 204. This unmasking of augmented highlight makes it easy to detect areas that would have, in the past, been missed out, such as masked portion 208, while evidence 210, 212 can be noted, tagged or documented by the user, and unsearched areas 214 remain masked. Thus, the portable communication device 202 comprises a display 230 for displaying a masked augmented reality to a search area or path of the incident scene 216, wherein the masked augmented reality is removable in response to a user based search.

While the masked search area or path 250 is based on user context, such as user experience, the impact of incident scene context, such as weather/rain, may also be taken into account to determine the application of removable masking to an area to be searched. For example, the impact on a particularly vulnerable piece of evidence, such as blood splatter, may be even higher than normal, if that blood splatter is located on a carpet next to open window (incident scene context). The blood splatter vulnerability to water and its location relative to the source of the water (a broken window) would indicate the need for a masked search area or masked search path 250 that brings the user as fast as possible to attend to the area near that evidence. Data can be taken quickly and/or as much of the evidence gathered and removed from the scene, and the masking removed to indicate that the area has been searched by that particular user-investigator. The removal of masking is recorded and stored, such as at database 119 of FIG. 1, user identification and user fixation times thereby providing information within the overall system as to who searched the area or path and how well the area or path 250 was searched.

Figure 3:
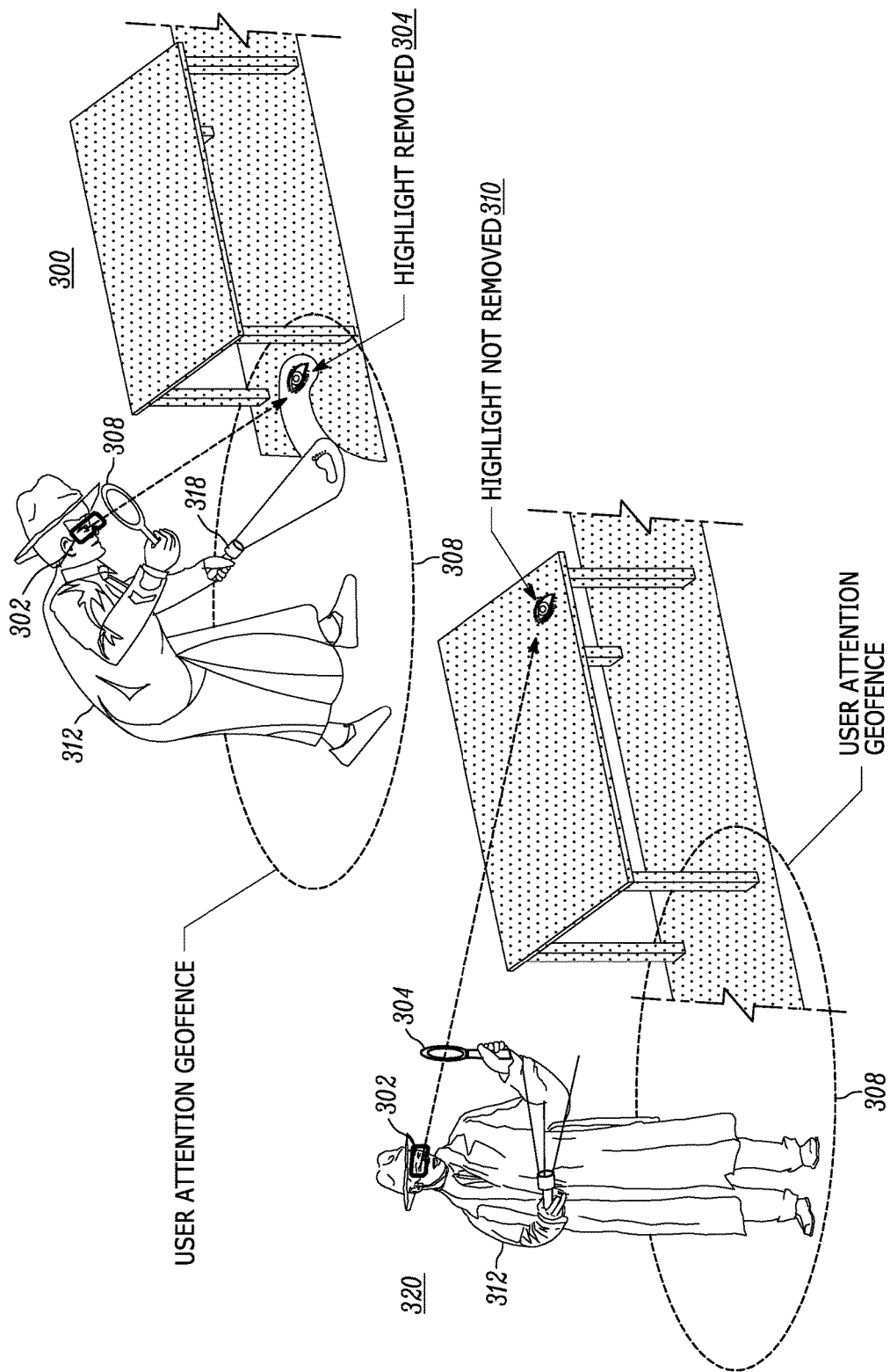
FIG. 3 shows an incident scene comparing views in which a portable communication device is displaying an augmented reality scene incorporating a geofence in accordance with some of the embodiments.

FIG. 3 shows a portable communication device 302 displaying a comparison of augmented reality incident scenes 300, 320 incorporating a geofence in accordance with some of the embodiments.

In view 300 augmented highlight is removed 304 indicating attention span of user 312 has been detected within a geofenced boundary 308. The user attention span can be detected such as by pairing the user's investigative tool, in this case a magnifying loop 308 or flash light, having a pairing sensor(s) integrated therein, to portable communication device 302 over a short wireless link, such as a bluetooth link, PAN link or the like. A camera mounted on wearable devices can also be used to detect a user's investigative tool and tool orientation through video analytics.

In view 320 augmented highlight is not removed, because the user 312 of portable communication device 302 has an attention span which is directed to an area 310 located outside of geofenced boundary 308. Even though pairing/detection of the user's investigative tools, magnifying loop 308 and/or flash light, to portable communication device 302 may take place, the location, positioning, and movement will indicate that the user's attention span is outside of the geofenced boundary. Thus, the masked highlight will not removed based on the user attention span going outside of the geofenced boundary.

In FIG. 3, the determination of the size for a single user geofenced boundary 308 is preferably based on user-context, such as job profile and expertise. In accordance with further embodiments the user geofenced boundary further also take into account incident scene context, such as indoor/outdoor location, time of day, evidence type being searched, to name a few. For more detailed searches additional geofenced boundaries can be applied as will be described in conjunction with FIG. 4.

Figure 4:
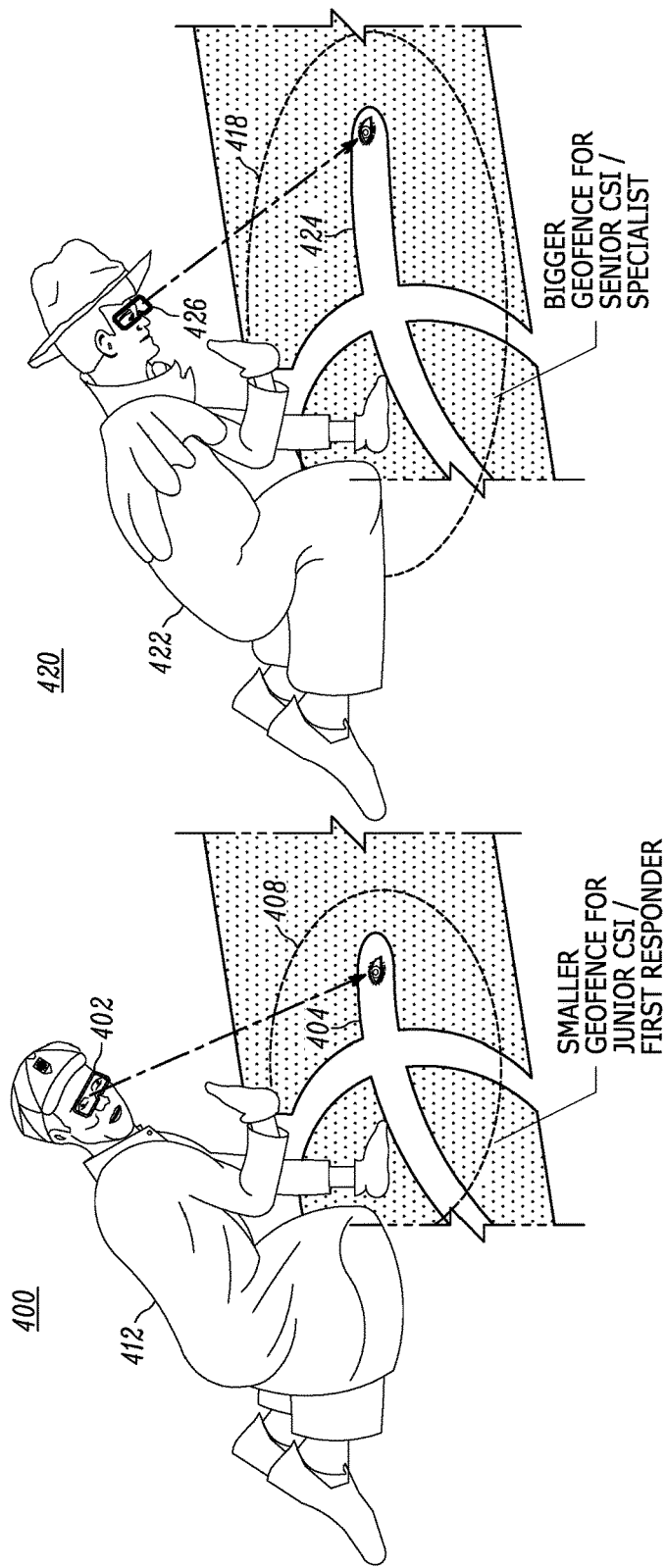
FIG. 4 shows an incident scene comparing views in which a portable communication device is displaying an augmented reality scene comparing geofenced circles for different seniority investigators in accordance with some of the embodiments.

FIG. 4 shows a portable communication device 402 displaying a comparison of augmented reality incident scenes 400, 420 comparing geofenced circles for different seniority investigators in accordance with some of the embodiments.

In view 400 augmented highlight is removed 404 indicating that an attention span of user 412 has been detected within a geofenced boundary 408. In view 420, a larger portion of augmented masked highlight 424 is removed, because the user 422 of portable communication device 426 has a larger geofenced boundary 418 associated therewith commensurate with a more senior, specialist user profile capable of searching within a larger area. By providing the augmented removable masking in conjunction with goefenced boundary to the HMD display a more thorough approach to searching has been provided.

As can be seen in FIG. 4, the augmented scenario for junior responder 412 is different that the augmented scene for senior specialist 422. Senior specialist 422 has a larger geofenced area within which a larger area of masking can be removed. The application of different geofenced boundaries 408, 418, as seen through HMD devices 402, 426, provide the advantage of providing indicators of areas to search based on the user profiles and expertise. In accordance with further embodiments, the geofences 408, 418 can also be dynamically adjusted for each individual, taking into account user context from the context factors 125 which can be updated to the HMD devices, or stored locally within the device.

Figure 5:
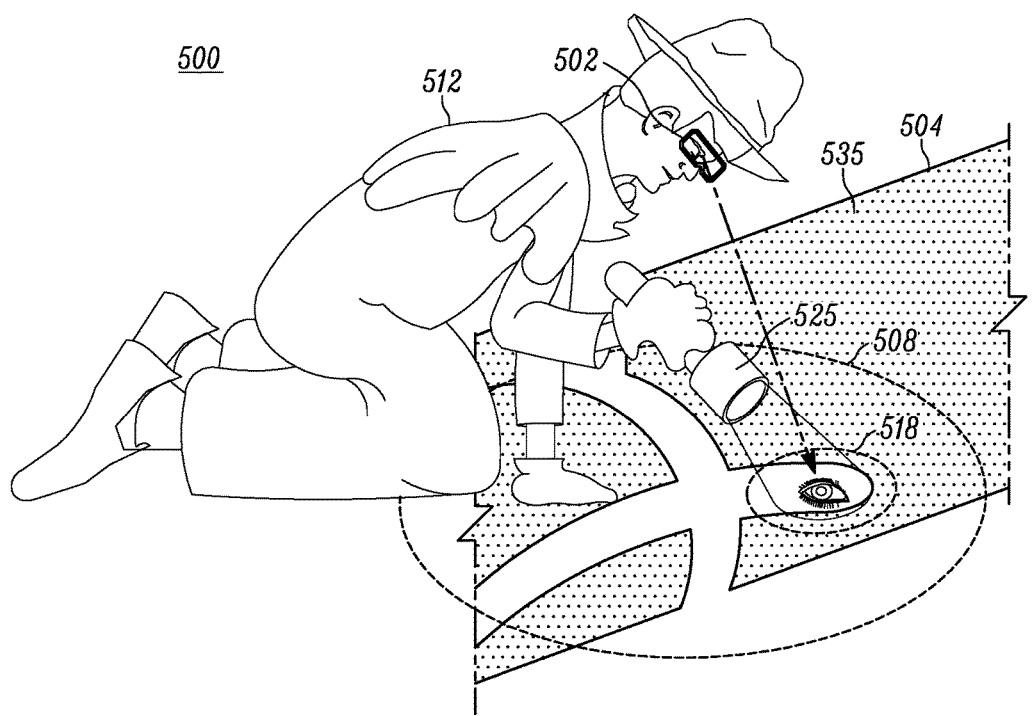
FIG. 5 shows an incident scene in which a portable communication device is displaying an augmented reality scene including nested geofenced circles in accordance with some of the embodiments.

FIG. 5 shows an incident scene 500 in which a portable communication device 502 is displaying an augmented reality scene 504 including nested geofenced boundaries 508 and 518 in accordance with some of the embodiments. In some embodiments, the smaller geofence 518 provides an indicator to user 512 as to where to focus his attention span. The movement and location tracking of the user's tool (flashlight) 525 along with the illumination of the flashlight 525 is tracked by the portable communication device. If the user attention span move within geofenced boundary 518, masked highlight within geofenced boundary 518 will be removed and higher attention value on this region will be recorded, which might be retrieved in later time or another investigator (e.g. supervisor) device reconstructs the user 512 attention heat map on his device. If the user attention span moves within geofenced boundary 508, masked highlight within geofenced boundary 508 will be removed and lower attention value on this region (compared to geofence 518) will be recorded, which might be retrieved in later time or another investigator (e.g. supervisor) device reconstructs the user 512 attention heat map on his device.

In accordance with some embodiments, the use of two geofences can be advantageous in providing for a verification mode to verify thoroughness of a search. For example, when a user-investigator is using a tool, his/her eye gaze will be shifted to that tool. Thus, the tool geofence will have higher attention weight (because the user's attention within this region is more detailed and focused). When the user's attention is focused within the user context geofence, the context geofence will have a lower attention weight (which occurs when the user looks outside of illuminated area of the torch light). These attention weights can be used during a verification mode in which together with attention fixation time determine a heat map that can be shown on the HMD device to show which areas of the scene have been thoroughly searched and which areas have not. For example, if the user tends to look outside of the tool geofence and only at the user context geofence, then the user attention heat map during verification mode will be displayed, for example, in a lighter color. A supervisor mode can also be generated which is similar to the verification mode, but displays heat maps for thoroughness of search for multiple users.

Figure 6:
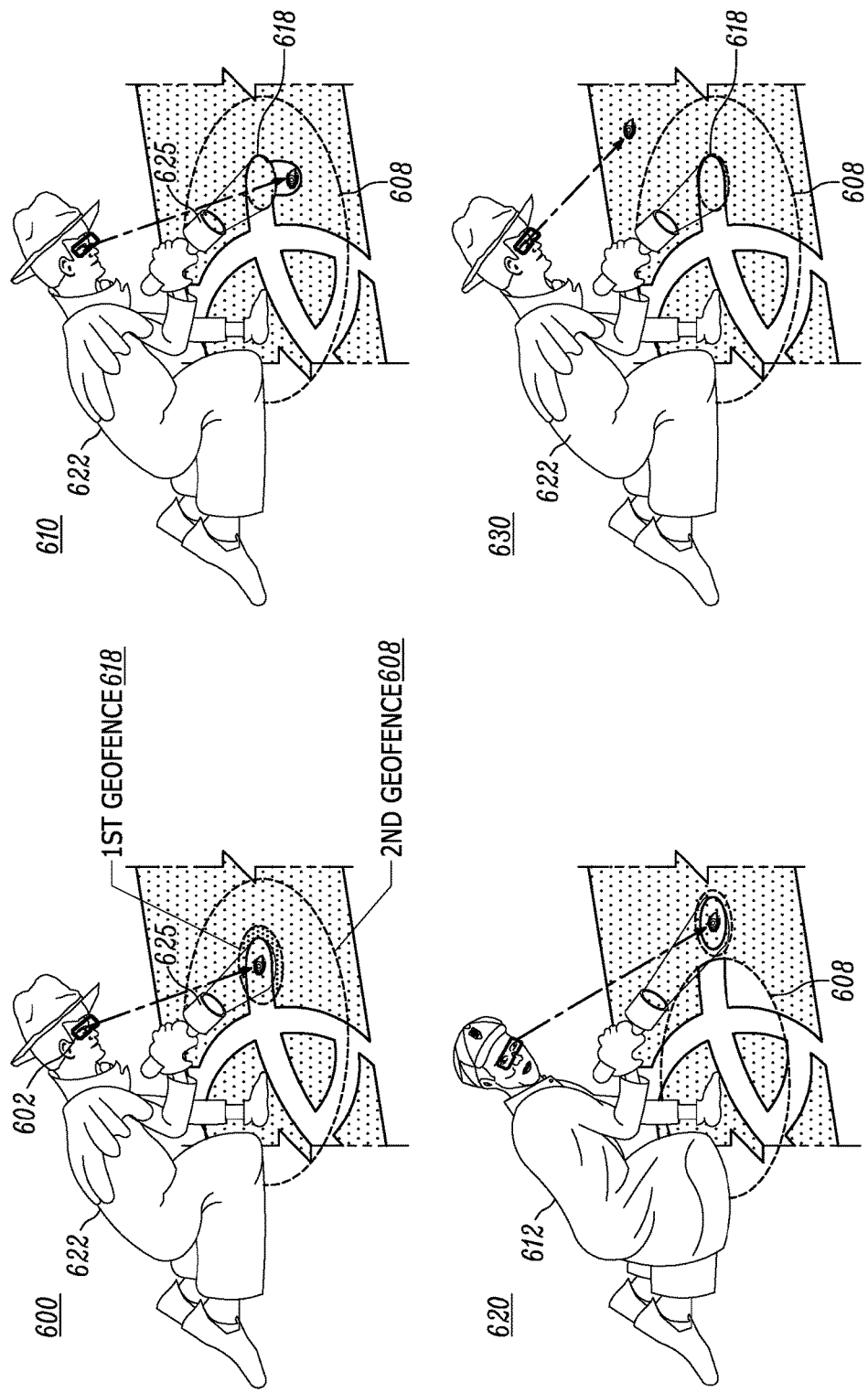
FIG. 6 shows a comparison of a portable communication device displaying an augmented reality scene including first and second geofenced circles in accordance with different user attention spans for nested geofenced embodiments.

FIG. 6 shows a comparison of a portable communication device 602 displaying an augmented reality scene 604 including first and second geofenced circles 608 and 618 in accordance with different user attention span for nested geofenced embodiments. The same HMD 602 and the same augmented incident scene are compared.

In view 600, a larger geofence 618 provides boundary to senior user-investigator 622 as to where to focus his attention span. The movement and location tracking of a tool (flashlight) 625 along with the illumination of the flashlight are tracked by short range wireless pairing of the portable communication device (HMD) 602 with tool 625, thereby allowing the portable communication device 602 to derive the attention span of user 622 and remove the masked highlight when the attention span is determined to fall within the geofenced boundary 608. Hence, the user's attention span will be registered and masking will be removed from the augmented display.

In view 610, the senior investigator user's attention span has moved outside of the smaller geofenced boundary 618 formed by the tool (flashlight) but his attention span has remained within the larger geofenced boundary 608. Applied weighting factors can be applied to adjust for the lower attention span. The augmented masking can still be removed since the user has retained an attention within the larger geofence 608. However, the weighting factors may, for example, limit the amount of masking being removed to a smaller portion, until the user returns the illumination of the lamp into the appropriate tracking location position. Hence, the user's attention span will be registered and masking will be removed from the augmented display. Alternatively, the weighting can be applied such that a different weight is recorded when the user attention is outside of the $1^{st}$ geofence and within the $2^{nd}$ geofence. The weighting can be adjusted based on the incident, tools, and can be configured in a variety of ways suitable to the type of search being conducted.

In view 620, a different user 612 who is more junior and less experienced has come to the scene, and HMD of user 612 displays an adjusted, smaller geofenced boundary 608, because that individual's user profile indicates a less experienced investigator and junior role. Another nested geofenced boundary 618 is formed based on the tool (flashlight) 625 (this can be the same flashlight or a different flashlight, or a completely different tool that can be paired to portable device 602).

As can be seen in view 620, the junior user 612 is shinning the light of tool 625 outside of the larger geofenced boundary 608, and his attention span has followed the light. Although his attention span remains within the smaller geofenced boundary 618 as determined by the paired device 602 and tool 625 tracking of movement and location, since the smaller geofence 618 is no longer nested within the larger geofenced boundary 608, then no masking will be removed. Thus, in accordance with some embodiments, breaking of the nested geofenced configuration stops removal of masking. The nested geofenced configuration provides investigators with boundaries appropriate for each individual investigators level of seniority and/or expertise thus optimizing the searching of an incident scene. Accordingly, when the user's attention span is outside of the larger, second geofenced boundary 608, the user's attention span is not registered and no masking is removed.

In view 630, the more senior user 622 is shown again with his user's attention span being moved outside of his larger geofenced boundary 608. Also, in this scenario, the tool (flashlight) 625 has remained illuminated within the larger geofenced boundary 608. In accordance with the embodiments, with the pairing of the tool with the portable communication device's location tracking and movement tracking, the user's attention span will not be registered and no masking will be removed from the augmented display.

Accordingly, the views of 600, 610, 620, 630 shows that the combination of appropriate user attention span within a nested geofence, set based on user context, will remove the masking from an augmented display formed and operating in accordance with the geofenced embodiments.

Figure 7:
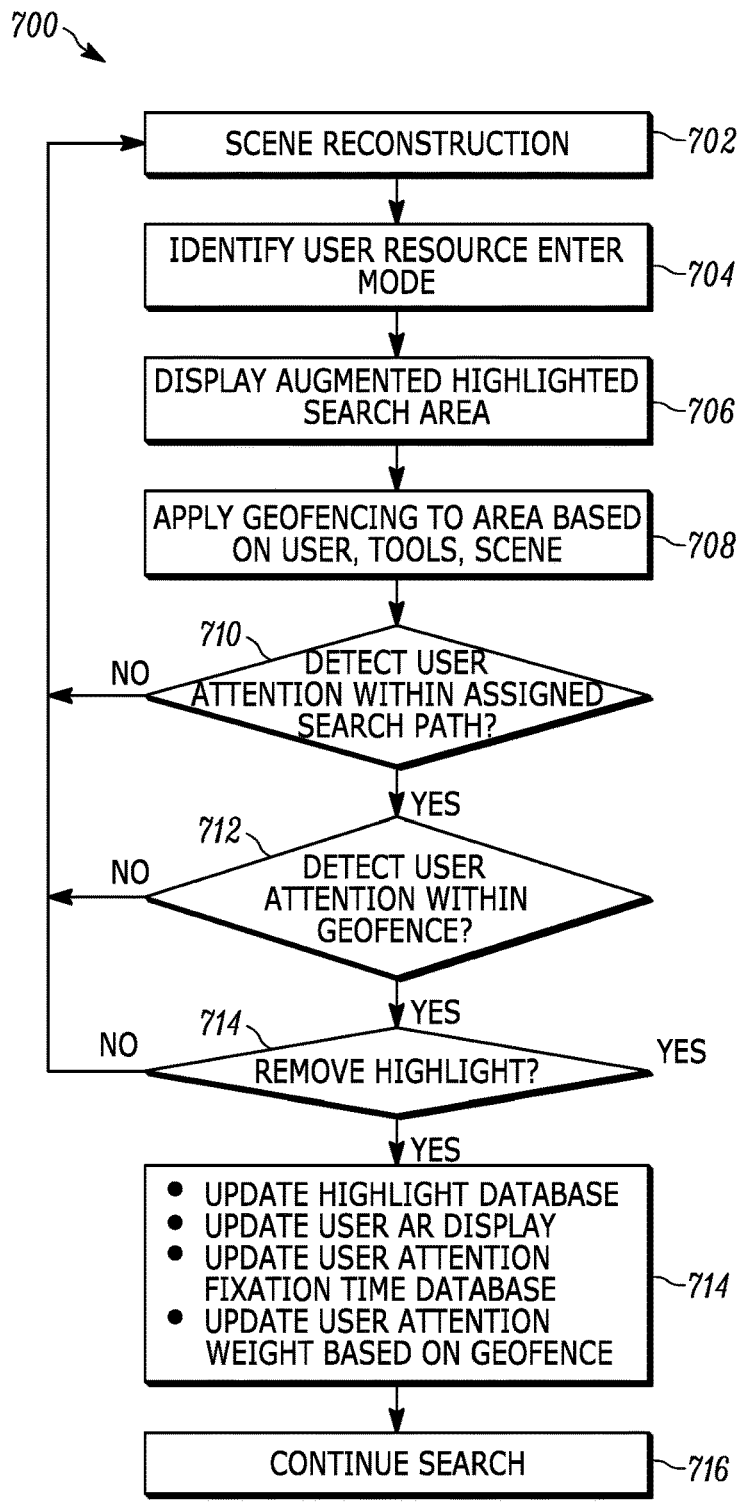
FIG. 7 is a flowchart of a method for searching an incident scene in accordance with some embodiments.

FIG. 7 is a flowchart of a method 700 for searching an incident scene in accordance with some embodiments. Method 700 begins by performing scene reconstruction at 702. The scene reconstruction can be performed as previously described using a variety of augment reality generation techniques, based on context data gathered at the incident scene, either via walkthrough and/or externally monitored and uploaded to the communication device as previously described in conjunction with FIG. 1.

In accordance with the embodiments, user context is entered to the portable communication device at 704. The user context may comprise a user profile of one or more users. The user profiles may comprise user experience, role and/or expertise, and the like.

In accordance with some embodiments, method 700 proceeds by displaying a masked augmented reality of a search area to the display of the portable communication device at 706. The masked augmented reality may comprise highlighting generated by HMD (full view or partial view), smart phone and tablet and is removable in response to an area being searched with an appropriate attention span.

At 708, a geofenced boundary is applied within the displayed masked augmented reality of the search area. The geofenced boundary is indicative of an area to search and is based, at least initially, on user context. In addition to user context the geofenced boundary may further be based on tool context and/or incident scene context. For additional geofences, such as a nested geofence configuration, the outer geofenced boundary may be based on user context and the inner geofenced boundary may be based on tool context. Incident scene parameters can be applied to either or both of these geofenced boundaries as appropriate.

As the user begins searching, detection is made whether the user is within an assigned search path/assigned search area at 710. This is the path/area that was determined based on user context.

For embodiments in which geofencing is applied, if the user is within the assigned path/assigned search area, then a portable communication device determines whether the user attention span falls within a geofenced boundary at 712. If, the user's attention span does fall within the geofenced boundary at 712, then masking is removed. At 714, the system will determines if the area of user attention span focus has already removed the highlight or whether the highlight is still masked at the augmented reality display. If the highlight has already been removed in a previous search (e.g. search by the user 5 seconds before and highlight removed at that time), then no action is needed, other than verification if desired, otherwise the search is considered complete until the nest scene reconstruction at 702. If the highlight is present at 714, then the highlight will be removed as this time, as this is the first time the user attention is focused on the area.

The removal of masking 714 triggers updates at 715 to any databases associated with updating masking to the AR display, recording of user attention span and weighting factors. Thus, the search can continue at 716 with updated masking and tracking.

Figure 8:
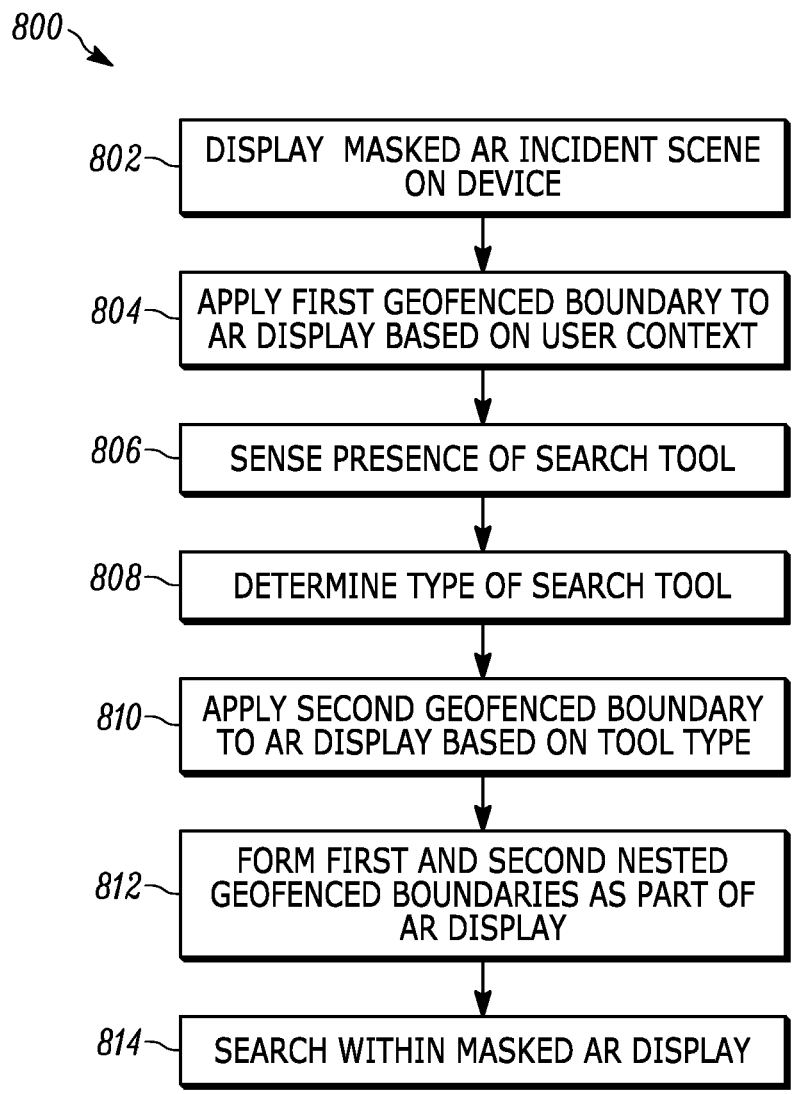
FIG. 8 is a flowchart summarizing a method for searching an incident scene in accordance with a nested geofence embodiment.

FIG. 8 is a flowchart summarizing a method for searching an incident scene in accordance with the nested geofenced embodiments. Beginning at 802 by displaying a masked augmented reality of the incident scene to a display of a portable communication device, followed at 804 by applying a first geofenced boundary to the displayed masked augmented reality of the incident scene based on user context. In some embodiments, the user context may comprise one or more of user role and/or user experience. For example, a first, external geofenced boundary may be set based on the experience of the user ranging from a larger geofenced boundary for an experienced incident scene investigator to a setting of a smaller geofenced boundary for a junior level incident scene investigator.

Moving to 806, the portable communication device senses for the presence of a search tool for investigating the incident scene and upon sensing the presence of the tool, then determining what type of search tool is sensed at 808. At 810, a second geofenced boundary is applied within the displayed masked augmented reality of the incident scene, based on the type of search tool determined at 808, thereby forming first and second nested geofenced boundaries at 812 as part of the masked augmented reality display. The tool type is determined by the portable communication device, and based on the tool type a predetermined geofenced boundary is applied. The tool location may be tracked by the portable communication device. Different tools may have different sized geofenced boundaries associated therewith, but should remain smaller than the larger user-based geofenced boundary to allow for a nested configuration search approach.

Searching of the incident scene can take place at 814 guided by the display of masked augmented reality provided by the portable communication device. A user's concentration span focused within the first and/or second nested goefenced boundaries, results in the removal of masking from the displayed augmented reality, thereby indicating that the area has been searched.

In accordance with some embodiments, the user attention span within first and second geofenced boundaries can be weighted. For example, the larger geofenced boundary may be weighted by a first weighting factor to vary the size of the geofence in response to user context, while the second smaller geofenced boundary may be weighted by a second weighting factor to vary the size of the second geofence based on tool context (tool type). In some embodiments, the larger geofenced boundary may further be weighted to vary the size of the geofence in response incident scene context parameters. These weighting factors monitor and record the thoroughness of the search which can also be displayed as a heat map in the display during a verification mode, if desired.

Accordingly, there has been provided an improved approach for searching an incident scene using a portable communication device incorporating an augmented reality display with removable masking which can be further enhanced through the application of a geofenced boundary and/or nested geofenced boundaries.

The the various embodiments have provided for a portable communication device that provides a view through a display of the incident scene augmented with removable masking. The portable communication device can further provide a geofenced boundary within the masked display to facilitate a search based on a user context, the removal of augmented reality masking being limited to within that geofenced boundary.

The portable communication device can further be enhanced through the application of nested geofenced boundaries. These boundaries are set based on user context (experience, role) and tool context (tool type). By tracking a user's attention span and movement of an investigator's tool, such as light from a flashlight, the removal of AR masking occurs in response to user attention within the nested boundaries. Geofenced boundaries can be weighted for different user roles and experience levels so that individual user-investigators are able to operate efficiently. The same portable device can be used amongst different users as the various user context parameters can be stored within a communication system user-resource database.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of searching an incident scene, comprising:
displaying a masked augmented reality of the incident scene to a display of a portable communication device;
applying a geofenced boundary within the displayed masked augmented reality of the incident scene, the geofenced boundary being indicative of an area to search;
searching the incident area; and
removing masking from the displayed masked augmented reality of the incident scene, the masking only being removed within the geofenced boundary based on user attention span provided within the geofenced boundary, the removal of masking indicating areas that have been searched;
applying nested geofenced boundaries within the displayed masked augmented reality of the incident scene, the nested geofenced boundaries being adjustably sized for higher and lower priority search areas based on user context and at least one of tool context and incident scene context.

2. The method of claim 1, further comprising:
moving to another area of the incident scene, the geofenced boundary being moved and updated with new removable masked highlight in response thereto.

3. The method of claim 1, wherein applying a geofenced boundary within the displayed masked augmented reality of the incident scene is based on user-context.

4. The method of claim 1, wherein applying a geofenced boundary within the displayed masked augmented reality of the incident scene is based on user-context and incident scene context.

5. The method of claim 4, further comprising:
adjusting a size of the geofenced boundary based on the user context, wherein the size of the geofenced boundary is adjusted to be larger for an experienced user, and the size of the geofenced boundary is adjusted to be smaller for a less experienced user.

6. The method of claim 4, wherein removing masking is based on user attention span within the geofenced boundary.

7. The method of claim 1, wherein applying a geofenced boundary within the displayed masked augmented reality of the incident scene, comprises:
applying nested geofenced boundaries within the displayed masked augmented reality of the incident scene, the nested geofenced boundaries having a first larger sized geofenced search boundary based on user context and incident scene context and a second smaller geofenced search boundary based on tool context.

8. The method of claim 1, wherein the portable communication device comprises a head mounted display (HMD).

9. A method of searching an incident scene, comprising:
displaying a masked augmented reality of the incident scene to a display of a portable communication device;

applying a first geofenced boundary to the displayed masked augmented reality of the incident scene based on user context;

sensing, by the portable communication device, a search tool presence for investigating the incident scene;

determining what type of search tool is sensed; and applying a second geofenced boundary to the displayed masked augmented reality of the incident scene based on the type of search tool determined, thereby forming first and second nested geofenced boundaries for searching within the masked augmented reality display.

10. The method of claim 9, (Original) The method further comprising:

removing masking from the displayed masked augmented reality of the incident scene on the portable communication device in response to user attention being moved within the first and second nested geofenced boundaries.

11. The method of claim 9, wherein the user context comprises at least one of:

user role and user experience.

12. The method of claim 11, wherein the user experience and user role comprises one of:

a more experienced incident scene investigator; and a junior level incident scene investigator.

13. The method of claim 11, wherein removal of masking from the displayed masked augmented boundary is based on:

user attention span within the first or second nested geofences.

14. The method of claim 9, further comprising:

applying a first weighting factor to the first geofenced boundary; and applying a second weighting factor to the second geofenced boundary; and wherein the first and second weighting factors provide verification of the search.

15. A portable communication device, comprising:

a display for displaying:

a masked augmented reality of a search area or path of an incident scene; and the masked augmented reality of the search area or path of the incident scene being removable in response to a user based search;

wherein the portable communication device comprises: a head mounted display (HMD);

wherein each of the first and second geofenced boundaries have a weighting factor associated therewith.

16. The portable communication device of claim 15, wherein removal of masking is based on:

user attention to the masked augmented reality.

17. The portable communication device of claim 15, wherein the display further comprises:

a geofenced boundary applied within the masked augmented reality.

18. The portable communication device of claim 17, wherein removal of masking is based on:

user attention to the masked augmented reality.

19. The portable communication device of claim 17, wherein the geofenced boundary is adjustable in size based on user experience and incident scene context.

20. The portable communication device of claim 17, further comprising another geofenced boundary displayed within the masked augmented reality of the search area or search path of the incident scene, forming first and second nested geofenced boundaries, the second geofenced boundary being nested within the first geofenced boundary.

21. The portable communication device of claim 15, wherein:

the first geofenced boundary has a larger size than the second geofenced boundary, the first geofenced boundary providing a predetermined search area based on a user context; and the second geofenced boundary, nested within the first geofenced boundary, has a smaller size based on the portable communication device sensing an investigative tool.

22. The portable communication device of claim 15, wherein:

the first geofenced boundary has a larger size than the second geofenced boundary, the first geofenced boundary providing a predetermined search area based on a user context and an incident scene context; and the second geofenced boundary, nested within the first geofenced boundary, has a smaller size based on tool context.

* * * * *